United States Patent
Yin

(10) Patent No.: US 9,632,361 B2
(45) Date of Patent: Apr. 25, 2017

(54) ALIGNMENT DEVICE AND MANUFACTURING METHOD FOR POLYMER STABILIZED VERTICAL ALIGNMENT LIQUID CRYSTAL PANEL

(75) Inventor: Chonghui Yin, Shenzhen (CN)

(73) Assignee: SHENZHEN CHINA STAR OPTOELECTRONICS TECHNOLOGY CO., LTD., Shenzhen, Guangdong (CN)

(*) Notice: Subject to any disclaimer, the term of this patent is extended or adjusted under 35 U.S.C. 154(b) by 713 days.

(21) Appl. No.: 13/503,373

(22) PCT Filed: Jan. 16, 2012

(86) PCT No.: PCT/CN2012/070370
§ 371 (c)(1),
(2), (4) Date: Apr. 23, 2012

(87) PCT Pub. No.: WO2013/091290
PCT Pub. Date: Jun. 27, 2013

(65) Prior Publication Data
US 2013/0165009 A1    Jun. 27, 2013

(30) Foreign Application Priority Data
Dec. 21, 2011    (CN) .......................... 2011 1 0433204

(51) Int. Cl.
*C09K 19/02*        (2006.01)
*G02F 1/1337*       (2006.01)
(Continued)

(52) U.S. Cl.
CPC ...... *G02F 1/133711* (2013.01); *G02F 1/1303* (2013.01); *C09K 2019/548* (2013.01);
(Continued)

(58) Field of Classification Search
None
See application file for complete search history.

(56) References Cited

FOREIGN PATENT DOCUMENTS

CN        1504974 A    *    6/2004
CN     101108968 A    *    1/2008
(Continued)

*Primary Examiner* — Tracie Y Green
(74) *Attorney, Agent, or Firm* — Cheng-Ju Chiang

(57) ABSTRACT

The present invention discloses an alignment device and a manufacturing method for polymer stabilized vertical alignment (PS-VA) liquid crystal panel. The method includes: forming a first substrate of PS-VA liquid crystal panel, the first substrate including a common electrode; forming a second substrate of the PS-VA liquid crystal panel, the second substrate including a pixel electrode; forming a liquid crystal layer between the first and second substrates, the liquid crystal layer containing negative liquid crystal molecules and ultraviolet-curable resin; applying an electrical voltage that exceeds a rotation threshold of the liquid crystal layer to the common electrode and the pixel electrode; and reciprocally moving an ultraviolet light source, which is composed of at least two ultraviolet light sources that are distributed parallel to each other in a first direction and respectively extend in a second direction, in such a direction as to have accumulation of ultraviolet light received by the ultraviolet-curable resin of the liquid crystal layer homogenized. Through the above operation, the present invention can make the accumulation of ultraviolet light received by the ultraviolet-curable resin of the liquid crystal layer homogenized so as to avoid the occurrence of displaying defects.

12 Claims, 11 Drawing Sheets

(51) Int. Cl.
*G02F 1/13* (2006.01)
*G02F 1/137* (2006.01)
*C09K 19/54* (2006.01)

(52) U.S. Cl.
CPC ............ *G02F 1/133788* (2013.01); *G02F 2001/13712* (2013.01); *G02F 2001/13775* (2013.01); *G02F 2001/133742* (2013.01); *G02F 2202/023* (2013.01)

(56) References Cited

FOREIGN PATENT DOCUMENTS

| CN | 101251671 A | 8/2008 |
| CN | 101308290 A | 11/2008 |
| CN | 101833191 A | 9/2010 |
| JP | 2006-234922 A | 9/2006 |

\* cited by examiner

ALIGNMENT DEVICE AND MANUFACTURING METHOD FOR POLYMER STABILIZED VERTICAL ALIGNMENT LIQUID CRYSTAL PANEL

BACKGROUND OF THE INVENTION

1. Field of the Invention

The present invention relates to the field of liquid crystal displaying, and in particular to an alignment device and manufacturing method for polymer stabilized vertical alignment (PS-VA) liquid crystal panel.

2. The Related Arts

Referring to FIGS. 1, 2, 3, and 4, FIG. 1 is a schematic view showing a conventional ultraviolet (UV) light source, FIG. 2 is a schematic view showing a conventional light source straight irradiating a polymer stabilized vertical alignment (PS-VA) liquid crystal panel, FIG. 3 is a schematic view showing a structure of a conventional PS-VA liquid crystal panel, and FIG. 4 is a plot showing the relationship between accumulation of ultraviolet light received by ultraviolet-curable resin contained in a conventional liquid crystal layer and position in X-X direction. As shown in FIG. 1, the ultraviolet light source is composed of at least two ultraviolet light sources 101. As shown in FIG. 2, a light source 201 straight irradiates a PS-VA liquid crystal panel 202. As shown in FIG. 3, a PS-VA liquid crystal panel comprises a first substrate 301, a second substrate 302, a slit zone 303, liquid crystal 304, and a bump 305. Since in the conventional method for manufacturing PS-VA liquid crystal panel, the light source is generally fixed when the PS-VA liquid crystal panel is subjected to exposure and since the light source is composed of equally-spaced ultraviolet light sources, the accumulation of ultraviolet light received by the ultraviolet-curable resin contained in the liquid crystal layer is not constant. As shown in FIG. 4, the amount of light received by the ultraviolet-curable resin that is located at a position corresponding to the interval between two ultraviolet light sources is relatively small, while the ultraviolet-curable resin of the liquid crystal layer that is located at a position corresponding to an ultraviolet light source has a relatively large ultraviolet light accumulation. The different amounts of light accumulation cause localized displaying defects, negatively affecting the displaying performance of a liquid crystal display device.

Thus, it is desired to have an alignment device and a manufacturing method for PS-VA liquid crystal panel that effectively eliminate the problem of displaying defect found in the conventional manufacturing process of PS-VA liquid crystal panel.

SUMMARY OF THE INVENTION

The general technical issue to be addressed by the present invention is the problem of displaying defect found in the conventional manufacturing process of polymer stabilized vertical alignment (PS-VA) liquid crystal panel.

To address the above discussed technical issue, the present invention adopts a technical solution, which provides an alignment device for polymer stabilized vertical alignment liquid crystal panel. The polymer stabilized vertical alignment liquid crystal panel comprises a first substrate, a second substrate, and a liquid crystal layer. The first substrate comprises a common electrode. The second substrate comprises a pixel electrode. The liquid crystal layer comprises negative liquid crystal molecules and ultraviolet-curable resin. The alignment device comprises: a voltage application module, which applies an electrical voltage that exceeds a rotation threshold of the liquid crystal layer to the common electrode and the pixel electrode; a light source, which comprises at least two ultraviolet light sources that are distributed parallel in a first direction, the ultraviolet light sources extending in a second direction and emitting ultraviolet lights to irradiate the polymer stabilized vertical alignment liquid crystal panel; and a light source movement control module, which controls the light source to reciprocally move in such a direction as to have accumulation of ultraviolet light received by the ultraviolet-curable resin of the liquid crystal layer homogenized.

Wherein, the light source comprises multiple ultraviolet light sources that are arranged in a parallel and equally spaced manner.

Wherein, the light source movement control module controls the light source to move in the first direction by a first predetermined distance and to subsequently move in a direction opposite to the first direction by the first predetermined distance to return to a home position, the movements being cyclically repeatable.

Wherein, the first predetermined distance is a half of a spacing distance between the ultraviolet light sources or a multiple of a half of the spacing distance between the ultraviolet light sources.

Wherein, the light source movement control module controls the light source to move in the first direction by a second predetermined distance and to subsequently move in a direction opposite to the first direction by a distance that is twice of the second predetermined distance and to further move in the first direction by the second predetermined distance to return to a home position, the movements being cyclically repeatable.

Wherein, the second predetermined distance is a half of a spacing distance between the ultraviolet light sources or a multiple of a half of the spacing distance between the ultraviolet light sources.

Wherein, the alignment device further comprises a speed adjusting module, and the speed adjusting module is coupled to the light source movement control module to supply a speed control signal to the light source movement control module. The speed control signal is applied to adjust moving speed of the light source.

Wherein, the alignment device further comprises a temperature control module, which controls temperature of the liquid crystal layer of the polymer stabilized vertical alignment liquid crystal panel, and a substrate retention module, which retains the polymer stabilized vertical alignment liquid crystal panel in position.

To address the above discussed technical issue, the present invention adopts a technical solution, which provides a method for manufacturing polymer stabilized vertical alignment liquid crystal panel. The method comprises: forming a first substrate of polymer stabilized vertical alignment liquid crystal panel, wherein the first substrate comprises a common electrode; forming a second substrate of the polymer stabilized vertical alignment liquid crystal panel, wherein the second substrate comprises a pixel electrode; forming a liquid crystal layer between the first substrate and the second substrate, wherein the liquid crystal layer comprises negative liquid crystal molecules and ultraviolet-curable resin; applying an electrical voltage that exceeds a rotation threshold of the liquid crystal layer to the common electrode and the pixel electrode; and reciprocally moving an ultraviolet light source, which is composed of at least two ultraviolet light sources that are distributed parallel to each other in a first direction and respectively extend in a second direction, in such a direction as to have accumulation of ultraviolet light received by the ultraviolet-curable resin of the liquid crystal layer homogenized.

Wherein, the step of reciprocally moving an ultraviolet light source, which is composed of multiple ultraviolet light sources that are distributed in a parallel and equally spaced manner in a first direction and extend in a second direction, in such a direction as to have accumulation of ultraviolet light received by the ultraviolet-curable resin of the liquid crystal layer homogenized comprises: moving the ultraviolet light source, which is composed of at least two ultraviolet light sources that are distributed parallel to each other in a first direction and respectively extend in a second direction, in the first direction by a first predetermined distance and subsequently moving in a direction opposite to the first direction by the first predetermined distance to return to a home position, the movements being cyclically repeatable.

Wherein, the step of reciprocally moving an ultraviolet light source, which is composed of multiple ultraviolet light sources that are distributed in a parallel and equally spaced manner in a first direction and extend in a second direction, in such a direction as to have accumulation of ultraviolet light received by the ultraviolet-curable resin of the liquid crystal layer homogenized comprises: moving the ultraviolet light source, which is composed of at least two ultraviolet light sources that are distributed parallel to each other in a first direction and respectively extend in a second direction, in the first direction by a half of a spacing distance between the ultraviolet light sources or a multiple of a half of the spacing distance between the ultraviolet light sources and subsequently moving in a direction opposite to the first direction by a half of a spacing distance between the ultraviolet light sources or a multiple of a half of the spacing distance between the ultraviolet light sources to return to a home position, the movements being cyclically repeatable.

Wherein, the step of reciprocally moving an ultraviolet light source, which is composed of multiple ultraviolet light sources that are distributed in a parallel and equally spaced manner in a first direction and extend in a second direction, in such a direction as to have accumulation of ultraviolet light received by the ultraviolet-curable resin of the liquid crystal layer homogenized comprises: moving the ultraviolet light source, which is composed of at least two ultraviolet light sources that are distributed parallel to each other in a first direction and respectively extend in a second direction, in the first direction by a second predetermined distance and subsequently moving in a direction opposite to the first direction by a distance that is twice of the second predetermined distance and further moving in the first direction by the second predetermined distance to return to a home position, the movements being cyclically repeatable.

Wherein, the step of reciprocally moving an ultraviolet light source, which is composed of multiple ultraviolet light sources that are distributed in a parallel and equally spaced manner in a first direction and extend in a second direction, in such a direction as to have accumulation of ultraviolet light received by the ultraviolet-curable resin of the liquid crystal layer homogenized comprises: moving the ultraviolet light source, which is composed of at least two ultraviolet light sources that are distributed parallel to each other in a first direction and respectively extend in a second direction, in the first direction by a half of a spacing distance between the ultraviolet light sources or a multiple of a half of the spacing distance between the ultraviolet light sources and subsequently moving in a direction opposite to the first direction by a distance that is twice of a half of a spacing distance between the ultraviolet light sources or a multiple of a half of the spacing distance between the ultraviolet light sources and further moving in the first direction by a half of a spacing distance between the ultraviolet light sources or a multiple of a half of the spacing distance between the ultraviolet light sources to return to a home position, the movements being cyclically repeatable.

Wherein, the method comprises: controlling temperature of the liquid crystal layer of the polymer stabilized vertical alignment liquid crystal panel in manufacturing process.

Wherein, the method comprises: adjusting a moving speed of the light source.

Wherein, the method comprises: retaining the polymer stabilized vertical alignment liquid crystal panel in position.

The efficacy of the present invention is that to be distinguished from the state of the art, the alignment device and manufacturing method for liquid crystal display device according to the present invention make use of moving light source to homogenize the accumulation of light received by ultraviolet-curable resin contained in a liquid crystal layer so that displaying defects generated due to non-uniform accumulation of light received in PS-VA liquid crystal panel can be avoided, rate of success for manufacturing PS-VA liquid crystal panel is increased, quality of PS-VA liquid crystal panel is improved, the chance of poor or degraded product is reduced, and thus the cost can be indirectly lowered down.

DETAILED DESCRIPTION OF THE PREFERRED EMBODIMENTS

Figure 3:
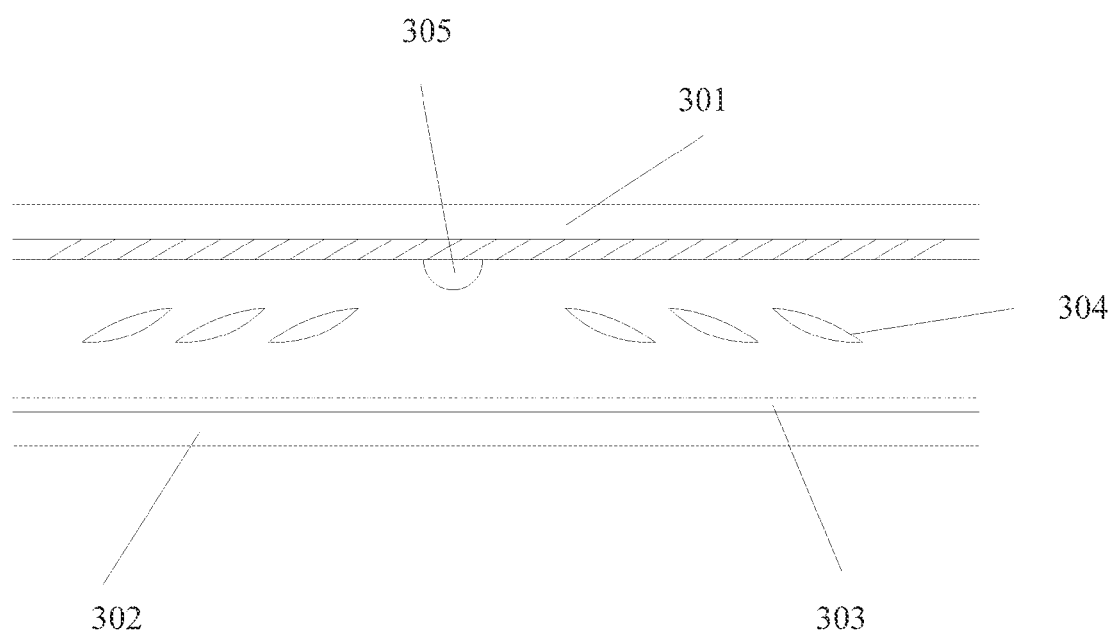
FIG. 3 is a schematic view showing a structure of a conventional PS-VA liquid crystal panel.
Figure 4:
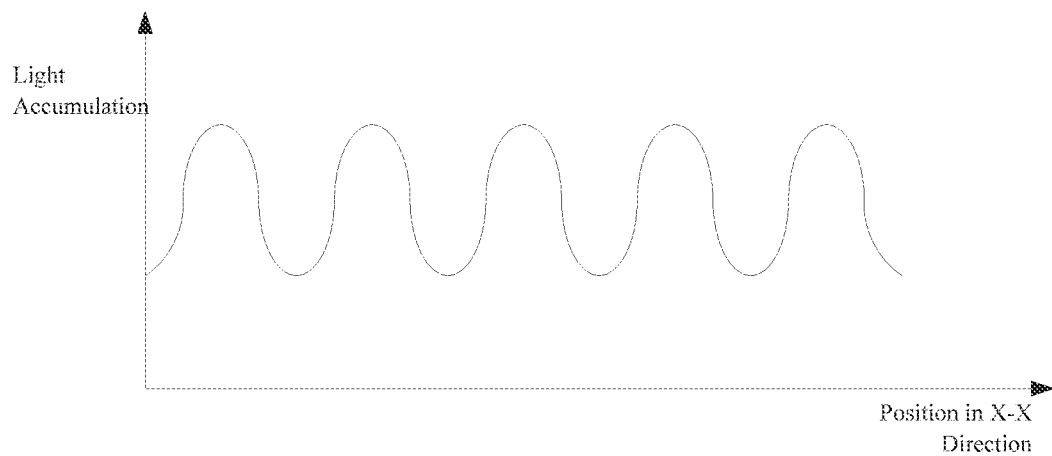
FIG. 4 is a plot showing the relationship between accumulation of ultraviolet light received by ultraviolet-curable resin contained in a conventional liquid crystal layer and position in X-X direction.
Figure 5:
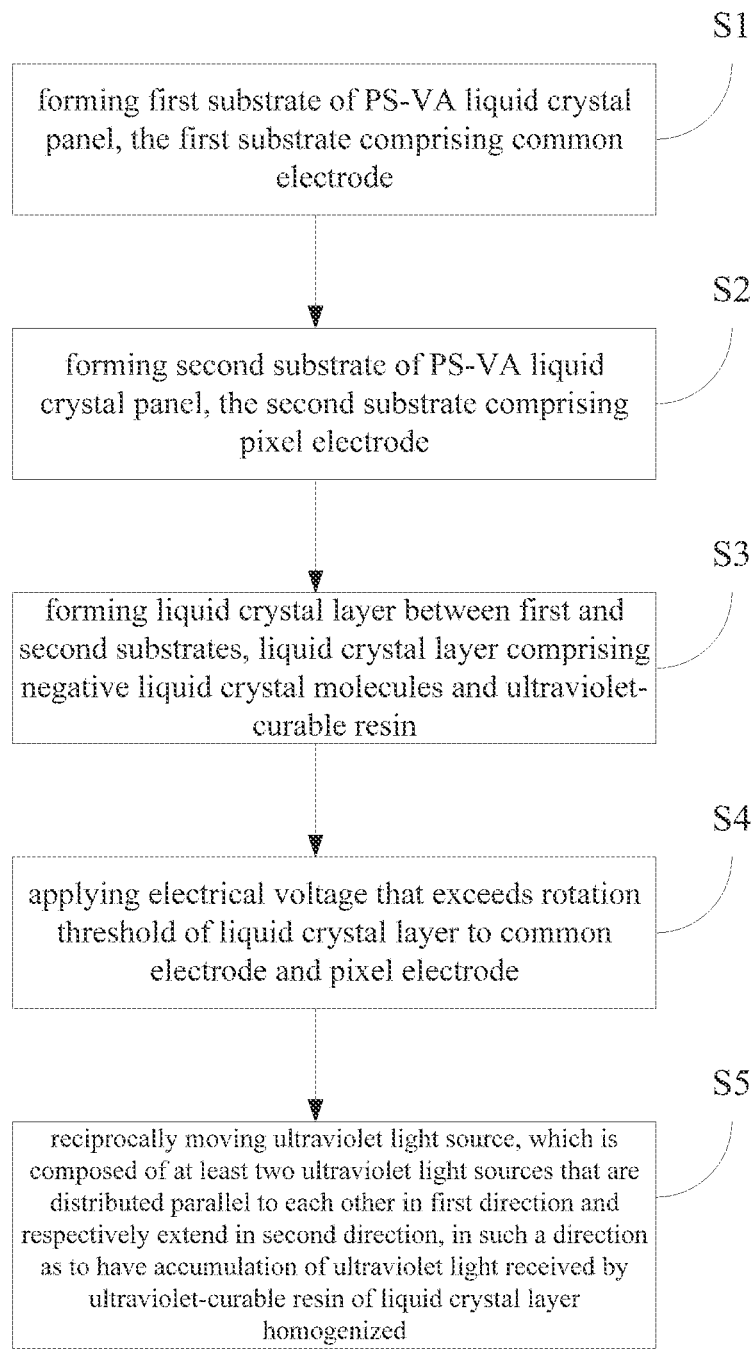
FIG. 5 is a flow chart illustrating a manufacturing method for PS-VA liquid crystal panel according to an embodiment of the present invention.

Referring to FIGS. 5 and 3, FIG. 5 is a flow chart illustrating a manufacturing method for polymer stabilized vertical alignment (PS-VA) liquid crystal panel according to an embodiment of the present invention and FIG. 3 is a schematic view showing a structure of a PS-VA liquid crystal panel. As shown in FIG. 5, the method for manufacturing PS-VA liquid crystal panel comprises the following steps:

Step S1: forming a first substrate of PS-VA liquid crystal panel, wherein the first substrate comprises a common electrode;

Step S2: forming a second substrate of the PS-VA liquid crystal panel, wherein the second substrate comprises a pixel electrode;

Step S3: forming a liquid crystal layer between the first substrate and the second substrate, wherein the liquid crystal layer comprises negative liquid crystal molecules and ultraviolet-curable resin;

wherein as shown in FIG. 3, in the instant embodiment, the first substrate and the second substrate are both a glass substrate and a bump 305 is formed on the first substrate and a slit zone 303 is provided, the slit zone 303 constraining the tilt direction of the liquid crystal molecules by inducing an electrical field; and the ultraviolet-curable resin is attached to the negative liquid crystal molecules, whereby the ultraviolet-curable resin, when receiving irradiation of ultraviolet light, tilts the negative liquid crystal molecules to which it is attached so that the negative liquid crystal molecules of the liquid crystal layer can be tilted through irradiation of ultraviolet light;

Step S4: applying electrical voltages that exceed rotation threshold of liquid crystal layer to a common electrode and a pixel electrode;

wherein upon a sudden application of high voltage, electrostatic energy causes liquid crystal molecules to randomly tilt and the liquid crystal molecules that tilt in a direction opposite to the direction in which the liquid crystal molecules are supposed to tilt will attempt to maintain tilting in the correct direction, for in the point of view of energy the liquid crystal molecules that tilt in the opposite direction are unstable; to maintain tilting in the correct direction requires the liquid crystal molecules to consume a great amount of energy and in such a process, the liquid crystal molecules must overcome the electrostatic energy for if the liquid crystal molecules cannot overcome the electrostatic energy, the liquid crystal molecules that tilt in the opposite direction would enter a metastable state and stay in such a state; however, an application of a voltage slightly greater than the threshold would cause the liquid crystal molecules that tilt in the opposite direction to overcome the electrostatic energy through a small amount of elastic energy to maintain tilting in the correct direction; and once the liquid crystal molecules get tilting in the correct direction, they no longer tilt in the opposite direction when the voltage is raised; and Step S5: reciprocally moving an ultraviolet light source, which is composed of at least two ultraviolet light sources that are distributed parallel to each other in a first direction and respectively extend in a second direction, in such a direction as to have the accumulation of ultraviolet light received by the ultraviolet-curable resin of the liquid crystal layer homogenized.

In the instant embodiment, the step of reciprocally moving the ultraviolet light source that is composed of at least two parallel arranged ultraviolet light sources in such a direction as to have the accumulation of ultraviolet light received by the ultraviolet-curable resin of the liquid crystal layer homogenized can be carried out in various ways according to different conditions. A detailed description will be given below with reference to several embodiments.

Figure 1:
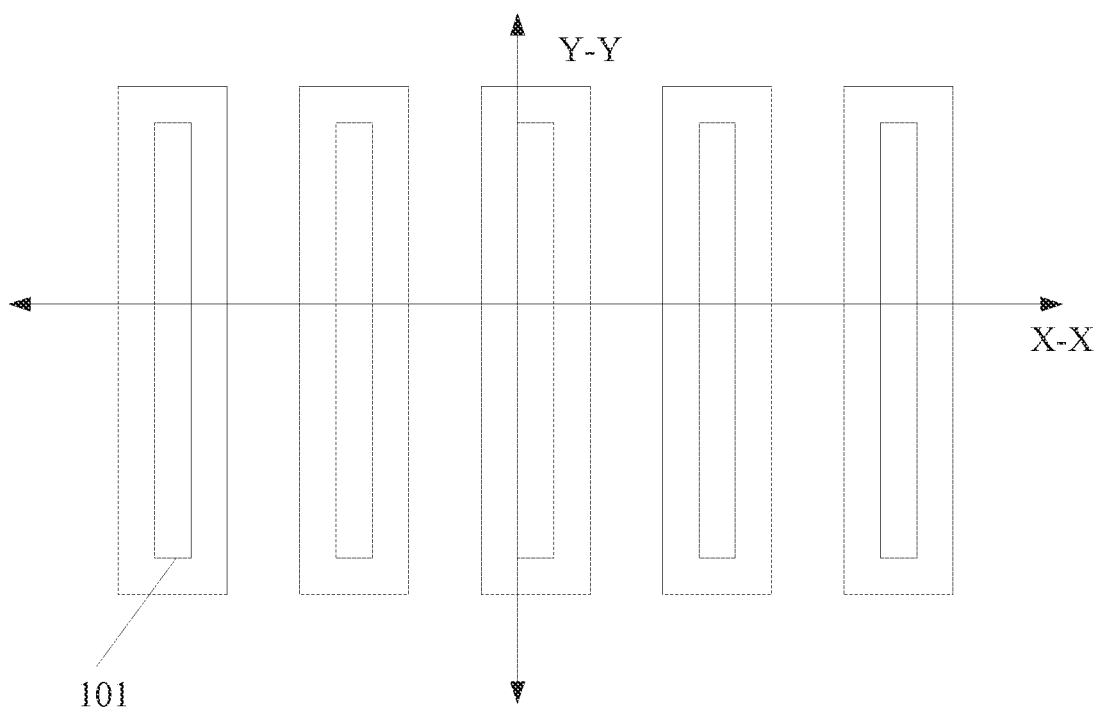
FIG. 1 is a schematic view showing a conventional ultraviolet (UV) light source.
Figure 2:
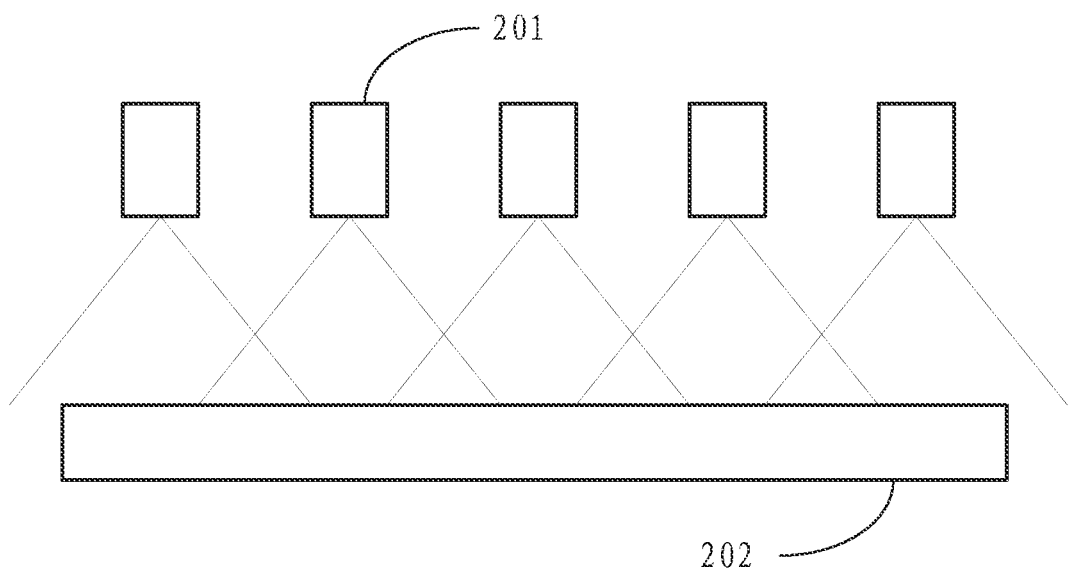
FIG. 2 is a schematic view showing a conventional light source straight irradiating a polymer stabilized vertical alignment (PS-VA) liquid crystal panel.
Figure 6:
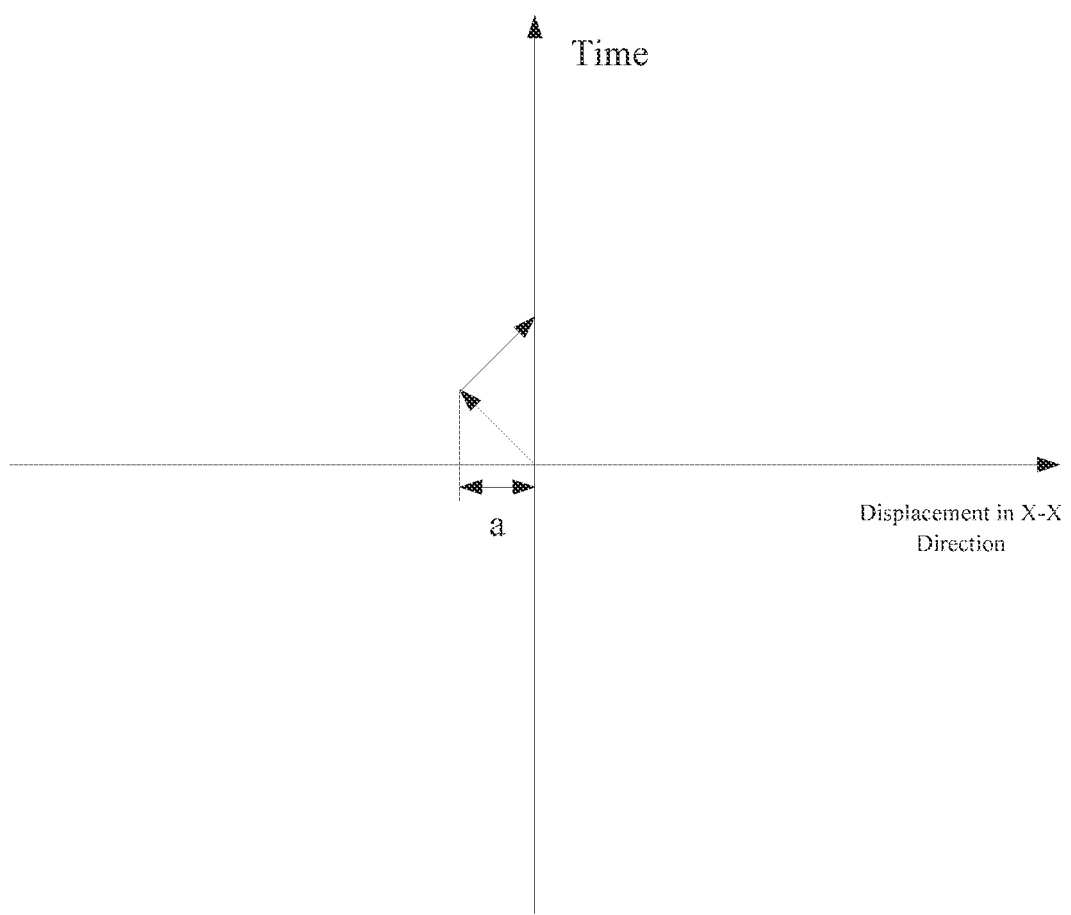
FIG. 6 is a plot showing the relationship between displacement of light source and time coordinate according to a first embodiment of the present invention.

Referring to FIGS. 2 and 6, FIG. 2 is a schematic view showing a conventional light source straight irradiating a PS-VA liquid crystal panel and FIG. 6 is a plot showing the relationship between displacement of light source and time coordinate according to a first embodiment of the present invention. As shown in FIGS. 2 and 6, in the first embodiment, a light source is first displaced by a distance a in a first direction, namely X-X direction, which is a direction perpendicular to the direction of ultraviolet light source on the plane where the ultraviolet light source is located, and is then displaced in a reversed or opposite direction by a distance a and this process is cyclically repeated. In the first embodiment, since the ultraviolet light source used is a light source composed of at least two parallel and equally spaced ultraviolet light sources, the distance a is half the spacing distance or interval between the two ultraviolet light sources. Through the above way, the relative position of each spot of the PS-VA liquid crystal panel with respect to the light source is constantly varied and the variation is regular and consistent for each spot, so that the accumulation of light received in each spot is made uniform.

Figure 7:
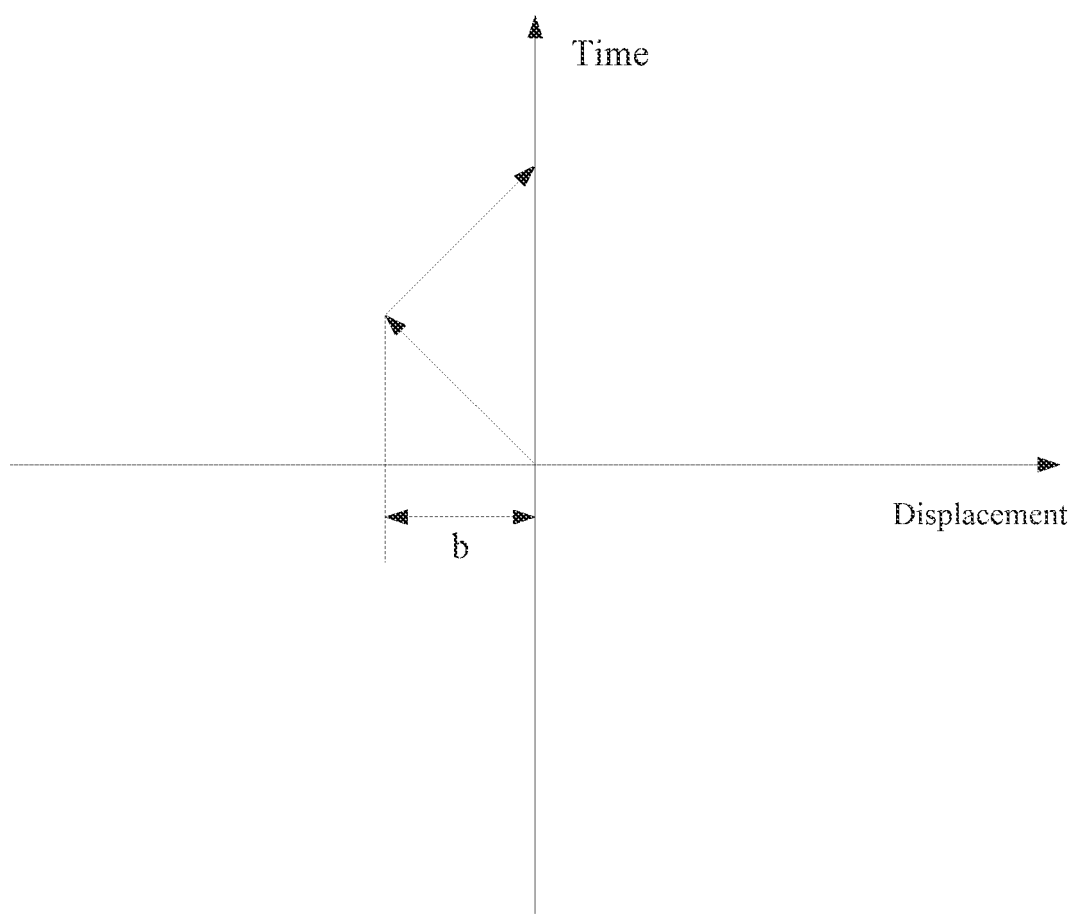
FIG. 7 is a plot showing the relationship between displacement of light source and time coordinate according to a second embodiment of the present invention.

Referring to FIGS. 2 and 7, FIG. 2 is a schematic view showing a conventional straight light source irradiating a PS-VA liquid crystal panel and FIG. 7 is a plot showing the relationship between displacement of light source and time coordinate according to a second embodiment of the present invention. As shown in FIGS. 2 and 7, in the second embodiment, a light source is first displaced by a distance b in a first direction, namely X-X direction, which is a direction perpendicular to the direction of ultraviolet light source on the plane where the ultraviolet light source is located, and is then displaced in a reversed or opposite direction by a distance b and this process is cyclically repeated.

In the second embodiment, the displacement distance b is the spacing distance between the two ultraviolet light sources.

In other embodiments, the same way of displacement as those of the first and second embodiments is adopted and the displacement distance can be a multiple of half the spacing distance between two ultraviolet light sources in order to eliminate the difficult of operation caused by excessively small spacing distance resulting from over-dense arrangement of the ultraviolet light sources.

In other embodiments, the displacement distance used is not a multiple of half the spacing distance between two ultraviolet light sources. Although those other displacement distances do not provide the optimum result, yet a certain extent of homogenization of the accumulation of ultraviolet light received by the ultraviolet-curable resin contained in the liquid crystal layer can be achieved.

Figure 8:
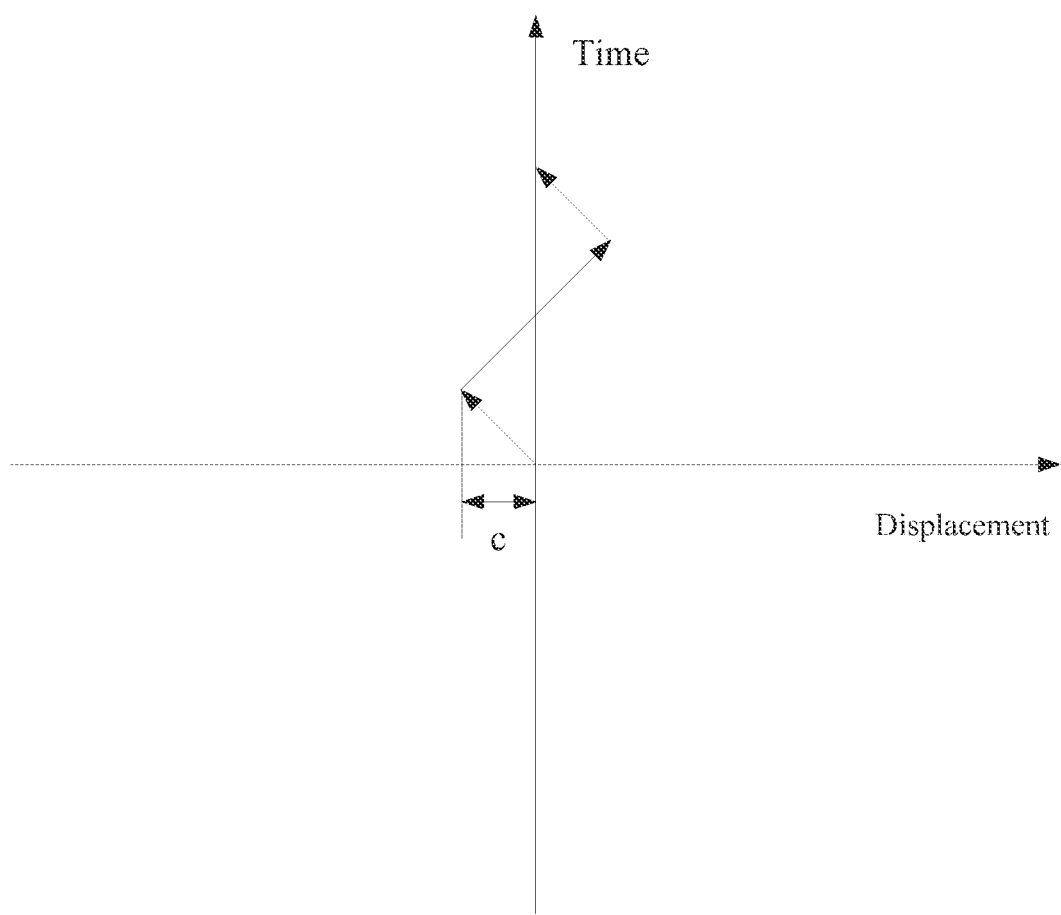
FIG. 8 is a plot showing the relationship between displacement of light source and time coordinate according to a third embodiment of the present invention.

Referring to FIGS. 2 and 8, FIG. 2 is a schematic view showing a conventional straight light source irradiating a PS-VA liquid crystal panel and FIG. 8 is a plot showing the relationship between displacement of light source and time coordinate according to a third embodiment of the present invention. As shown in FIGS. 2 and 8, in the third embodiment, a light source is first displaced by a distance c in a first direction, namely X-X direction, which is a direction perpendicular to the direction of ultraviolet light source on the plane where the ultraviolet light source is located, and is then displaced in a reversed or opposite direction by a distance $2c$, and is displaced again in the X-X direction by a distance c and this process is cyclically repeated. The operation principle of the third embodiment is generally similar to those of the first and second embodiments, but the way of cyclically repeated displacement adopted in the third embodiment is more complicated than those of the first and second embodiment. Since the displacement distance of each move is made longer, the error occurring in each cycle shows reduced influence on the whole cycle.

In the third embodiment, the distance c is half the spacing distance or interval between two ultraviolet light sources.

Figure 9:
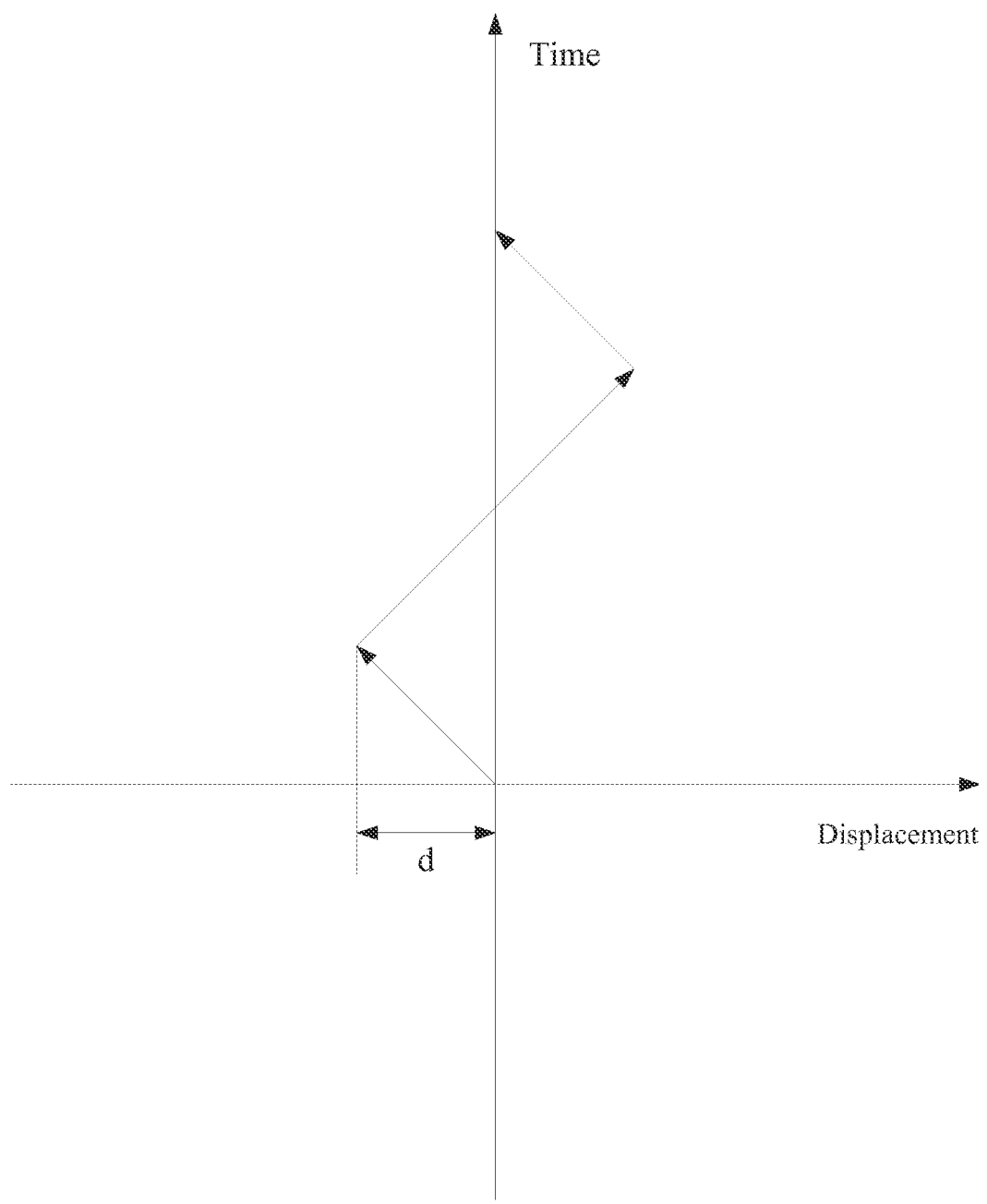
FIG. 9 is a plot showing the relationship between displacement of light source and time coordinate according to a fourth embodiment of the present invention.

Referring to FIGS. 2 and 9, FIG. 2 is a schematic view showing a conventional straight light source irradiating a PS-VA liquid crystal panel and FIG. 9 is a plot showing the relationship between displacement of light source and time coordinate according to a fourth embodiment of the present invention. As shown in FIGS. 2 and 9, in the fourth embodiment, a light source is first displaced by a distance d in a first direction, namely X-X direction, which is a direction perpendicular to the direction of ultraviolet light source on the plane where the ultraviolet light source is located, and is then displaced in a reversed or opposite direction by a distance 2d, and is displaced again in the X-X direction by a distance d and this process is cyclically repeated.

In the fourth embodiment, the displacement distance d is the spacing distance between two ultraviolet light sources.

In other embodiments, the same way of displacement as those of the third and fourth embodiments is adopted and the displacement distance can be a multiple of half the spacing distance between two ultraviolet light sources to serve as a new displacement distance.

In other embodiments, the displacement distance used is not a multiple of half the spacing distance between two ultraviolet light sources.

Although those other displacement distances do not provide the optimum result, yet a certain extent of homogenization of the accumulation of ultraviolet light received by the ultraviolet-curable resin contained in the liquid crystal layer can be achieved.

In the above discussed first, second, third, and fourth embodiment, the light source is arranged to provide straight irradiation and in the following, a description will be given for practicing the present invention with oblique irradiation of light source.

Figure 10:
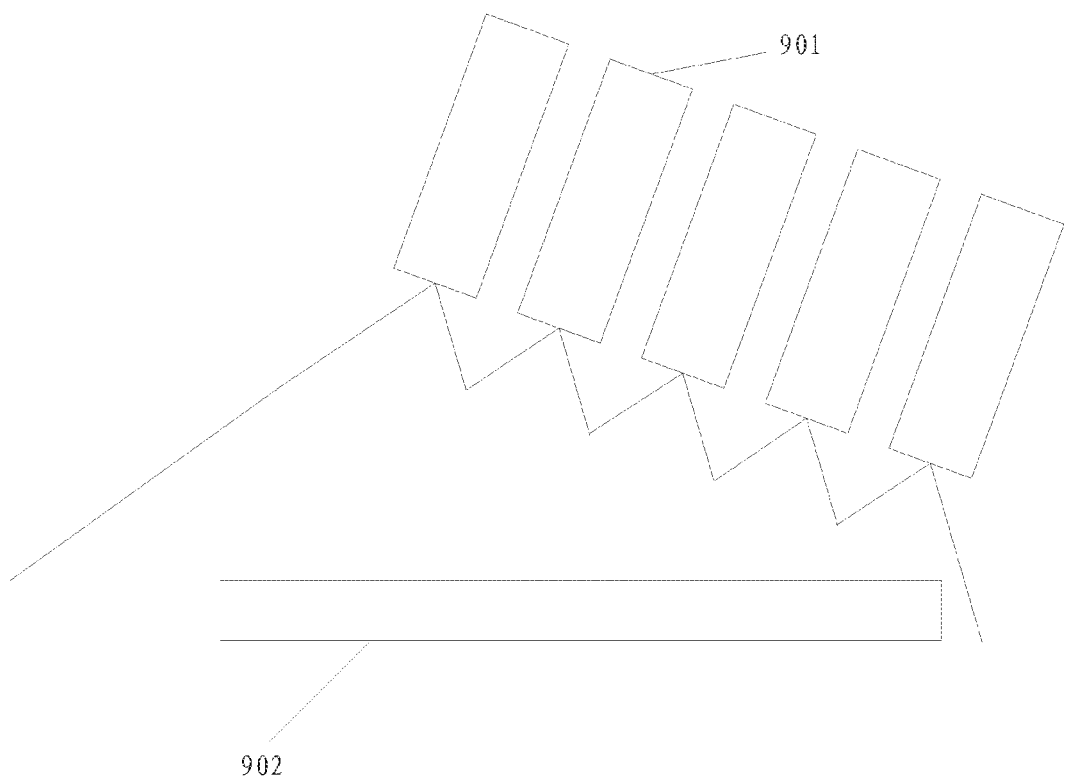
FIG. 10 is a schematic view showing a light source obliquely irradiating a PS-VA liquid crystal panel according to an embodiment of the present invention.

Referring to FIG. 10, FIG. 10 is a schematic view showing a light source obliquely irradiating a PS-VA liquid crystal panel according to an embodiment of the present invention. As shown in FIG. 10, a light source 1001 obliquely irradiates a PS-VA liquid crystal panel 1002. The light 1001 that is irradiated in an oblique manner causes a relatively large light accumulation received by the ultraviolet-curable resin that is contained in the liquid crystal layer at a location close to the light source, while the ultraviolet-curable resin that is contained in the liquid crystal layer at a location remote from the light source 1001 receives a relatively small amount of light accumulation. Under this condition, the accumulation of light received by the ultraviolet-curable resin contained in the liquid crystal layer can be made similar to that received in the case straight irradiation by adjusting the light intensity of each ultraviolet light source. In other words, the intensity of the light source that is close to the liquid crystal panel is made weak, while the intensity of the ultraviolet light source that is remote from the liquid crystal panel is made strong. Through such an arrangement, the oblique irradiation is in fact the same as the straight irradiation. Then, the way of displacement according to the present invention may be performed with the displacement distance properly varied according to certain factors, such as the angle of oblique. The above described processing with oblique irradiation and the variation of the displacement distance can be carried out in various ways and they can be readily appreciated by those skilled in the art based on the disclosure and the public knowledge of this field and considered belonging to the protection scope of the present invention. Further detail will not be repeated here.

In the instant embodiment, the operation is performed by such a way that the PS-VA liquid crystal panel is fixed, whereby in the process of irradiation, only the light source is moved and the PS-VA liquid crystal panel is kept stationary or fixed in position. This way makes controlling the relative movement between the light source and the PS-VA liquid crystal panel easier than the case that both the light source and the PS-VA liquid crystal panel are moved and is applicable to a case of relatively simple movement.

In other embodiments, based on practical needs, it is possible to make the PS-VA liquid crystal panel movable in order to effect simplification of certain complicated relative motions.

In the instant embodiment, different PS-VA liquid crystal panels and different requirements of product may need the PS-VA liquid crystal panels to be set at different temperature during the process of irradiation. After the initial adjustment of the surface temperature of the PS-VA liquid crystal panel is completed, the PS-VA liquid crystal panel may subsequently kept at such a temperature or the temperature may be varied as desired.

In the instant embodiment, the light source may have a moving speed that is adjustable and the speed may be adjusted from time to time in order to meet the needs of different requirements to control the light source for making a constant speed motion or a variable speed motion.

Figure 11:
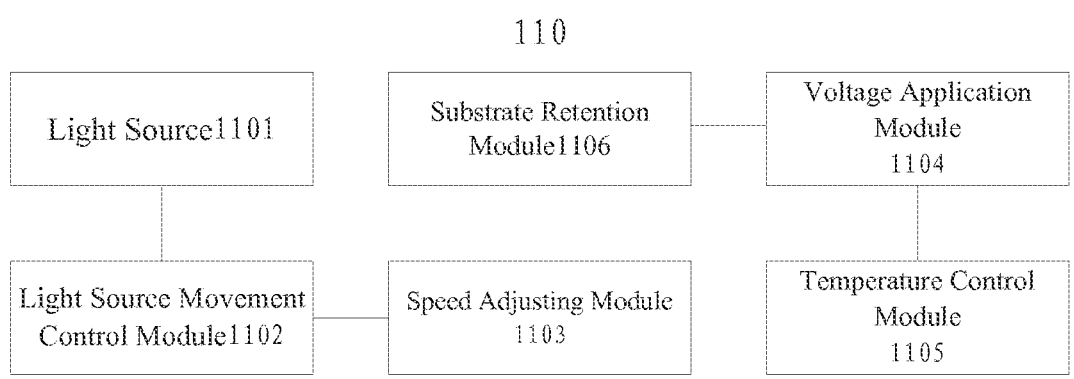
FIG. 11 is a schematic view showing an alignment device for the PS-VA liquid crystal panel according to an embodiment of the present invention.

Referring to FIG. 11, FIG. 11 is a schematic view showing an alignment device for the PS-VA liquid crystal panel according to an embodiment of the present invention. As shown in FIG. 11, the alignment device 110 for PS-VA liquid crystal panel comprises: a light source 1101, which comprises at least two ultraviolet light sources that are distributed parallel in a first direction, the ultraviolet light sources extending in a second direction and emitting ultraviolet lights to irradiate a PS-VA liquid crystal panel; a light source movement control module 1102, which controls the light source to reciprocally move in such a direction as to have the light accumulation of ultraviolet light received by ultraviolet-curable resin contained in a liquid crystal layer homogenized; a speed adjusting module 1103, which is coupled to the light source movement control module to supply a speed control signal to the light source movement control module, the speed control signal being applied to adjust moving speed of the light source; a voltage application module 1104, which applies an electrical voltage that exceeds a rotation threshold of the liquid crystal layer to a common electrode and a pixel electrode; a temperature control module 1105, which controls the temperature of the liquid crystal layer of the PS-VA liquid crystal panel; and a substrate retention module 1106, which retains the PS-VA liquid crystal panel in position.

In the instant embodiment, the light source movement control module 1102 allows a user to parameters of a movement mode, such as moving distance, the way of cyclically repeating, and the likes. The light source movement control module 1102 may store various movement modes and the use may is allowed to select a desired movement mode according to his or her needs or the user is allowed to store the movement mode set by himself or herself.

In the instant embodiment, the speed adjusting module 1103 may control the moving speed of the light source 1101 and the speed adjusting module 1103 may control the light source 1101 to carry out constant speed motion or variable speed motion, or to change the moving speed in the course of movement. Through the coordinated cooperation between the speed adjusting module 1103 and the movement module 1102, the light source 1101 can be controlled to take various modes of movement in order to meet the needs.

In the instant embodiment, the temperature control module 1105 control the temperature of the liquid crystal layer of the PS-VA liquid crystal panel. The temperature of the PS-VA liquid crystal panel during the process of irradiation is of great influence on the manufacture of PS-VA liquid crystal panel. The temperature control module may initially set the temperature of the PS-VA liquid crystal panel at the beginning and then just monitors the temperature of the PS-VA liquid crystal panel during the process of irradiation and makes necessary adjustment in order to prevent the quality of the PS-VA liquid crystal panel from being affected by temperature variation occurring in the substrate due to light irradiation.

The operation process and operation principle of the alignment device 110 for PS-VA liquid crystal panel may be referred to the above description regarding the manufacturing method for PS-VA liquid crystal panel and repeated description will not be given.

In summary, the alignment device and manufacturing method for liquid crystal display device according to the present invention make use of moving light source to homogenize the accumulation of light received by ultraviolet-curable resin contained in a liquid crystal layer so that displaying defects caused by non-uniform accumulation of light can be avoided, rate of success for manufacturing PS-VA liquid crystal panel is increased, quality of PS-VA liquid crystal panel is improved, the chance of poor or degraded product is reduced, and thus the cost can be indirectly lowered down.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the clams of the present invention.

What is claimed is:

1. An alignment device for a polymer stabilized vertical alignment liquid crystal panel, the polymer stabilized vertical alignment liquid crystal panel comprising a first substrate, a second substrate, and a liquid crystal layer, the first substrate comprising a common electrode, the second substrate comprising a pixel electrode, the liquid crystal layer comprising negative liquid crystal molecules and ultraviolet-curable resin, wherein the alignment device comprises:
   a voltage application module, which applies an electrical voltage that exceeds a rotation threshold of the liquid crystal layer to the common electrode and the pixel electrode;
   a light source, which comprises at least two ultraviolet light sources that are distributed parallel in a first direction that is inclined with respect to the polymer stabilized vertical alignment liquid crystal panel and are spaced from each other in the first direction, the at least two ultraviolet light sources being spaced from the polymer stabilized vertical alignment liquid crystal panel by different distances so that a first one of the at least two ultraviolet light sources is spaced from the polymer stabilized vertical alignment liquid crystal panel by a first distance and a second one of the at least two ultraviolet light sources is spaced from the polymer stabilized vertical alignment liquid crystal panel by a second distance that is greater than the first distance, the ultraviolet light sources extending in a second direction and emitting ultraviolet lights of different intensities to irradiate the polymer stabilized vertical alignment liquid crystal panel, wherein the first one of the at least two ultraviolet light source emits ultraviolet light at a first intensity and the second one of the at least two ultraviolet light source emits ultraviolet light at a second intensity that is greater than the first intensity; and
   a light source movement control module, which controls the light source to reciprocally move in such a direction as to have accumulation of ultraviolet light received by the ultraviolet-curable resin of the liquid crystal layer homogenized.

2. The alignment device as claimed in claim 1, wherein the light source comprises multiple ultraviolet light sources that are arranged in a parallel and equally spaced manner.

3. The alignment device as claimed in claim 2, wherein the light source movement control module controls the light source to move in the first direction by a first predetermined distance and to subsequently move in a direction opposite to the first direction by the first predetermined distance to return to a home position, the movements being cyclically repeatable.

4. The alignment device as claimed in claim 3, wherein the first predetermined distance is a half of a spacing distance between the ultraviolet light sources or a multiple of a half of the spacing distance between the ultraviolet light sources.

5. The alignment device as claimed in claim 2, wherein the light source movement control module controls the light source to move in the first direction by a second predetermined distance and to subsequently move in a direction opposite to the first direction by a distance that is twice of the second predetermined distance and to further move in the first direction by the second predetermined distance to return to a home position, the movements being cyclically repeatable.

6. The alignment device as claimed in claim 5, wherein the second predetermined distance is a half of a spacing distance between the ultraviolet light sources or a multiple of a half of the spacing distance between the ultraviolet light sources.

7. The alignment device as claimed in claim 1, wherein the alignment device further comprises a speed adjusting module, the speed adjusting module being coupled to the light source movement control module to supply a speed control signal to the light source movement control module, the speed control signal being applied to adjust moving speed of the light source.

8. The alignment device as claimed in claim 1, wherein the alignment device further comprises a temperature control module, which controls temperature of the liquid crystal layer of the polymer stabilized vertical alignment liquid crystal panel, and a substrate retention module, which retains the polymer stabilized vertical alignment liquid crystal panel in position.

9. An alignment device for a liquid crystal panel, comprising:
   a voltage application module, which applies, to a liquid crystal panel, an electrical voltage that exceeds a rotation threshold of the liquid crystal panel;
   a light source, which comprises at least two ultraviolet light sources that are distributed parallel in a first direction that is inclined with respect to the liquid crystal panel and are spaced from each other in the first direction, the at least two ultraviolet light sources being spaced from the liquid crystal panel by different distances so that a first one of the at least two ultraviolet light sources is spaced from the liquid crystal panel by a first distance and a second one of the at least two ultraviolet light sources is spaced from the liquid crystal panel by a second distance that is greater than the first distance, the ultraviolet light sources extending in a second direction and emitting ultraviolet lights of different intensities to irradiate the liquid crystal panel, wherein the first one of the at least two ultraviolet light source emits ultraviolet light at a first intensity and the second one of the at least two ultraviolet light source emits ultraviolet light at a second intensity that is greater than the first intensity; and a light source movement control module, which controls the light source to reciprocally move in such a direction as to have accumulation of ultraviolet light received by the liquid crystal panel homogenized.

10. The alignment device as claimed in claim 9, wherein the light source comprises multiple ultraviolet light sources that are arranged in a parallel and equally spaced manner.

11. The alignment device as claimed in claim 10, wherein the light source movement control module controls the light source to move in the first direction by a first predetermined distance and to subsequently move in a direction opposite to the first direction by the first predetermined distance to return to a home position, the movements being cyclically repeatable.

12. The alignment device as claimed in claim 11, wherein the first predetermined distance is a half of a spacing distance between the ultraviolet light sources or a multiple of a half of the spacing distance between the ultraviolet light sources.

* * * * *